United States Patent
Jin

(10) Patent No.: US 7,353,521 B1
(45) Date of Patent: Apr. 1, 2008

(54) OBJECT ORIENTED DISTRIBUTED SOFTWARE SYSTEM WITH METHODOLOGY FOR PIGGYBACKED REFLECTIVE CALLBACKS

(75) Inventor: Ke Jin, Foster City, CA (US)

(73) Assignee: Borland Software Corporation, Austin, TX (US)

( * ) Notice: Subject to any disclaimer, the term of this patent is extended or adjusted under 35 U.S.C. 154(b) by 781 days.

(21) Appl. No.: 10/340,812

(22) Filed: Jan. 10, 2003

Related U.S. Application Data

(60) Provisional application No. 60/420,053, filed on Oct. 19, 2002.

(51) Int. Cl.
G06F 9/44 (2006.01)

(52) U.S. Cl. ...................... 719/330; 719/316

(58) Field of Classification Search ........ 719/310–316, 719/328, 330–332, 312, 315; 709/226, 248; 707/10; 718/100
See application file for complete search history.

(56) References Cited

U.S. PATENT DOCUMENTS

| | | | |
|---|---|---|---|
| 4,949,248 A | 8/1990 | Caro .......................... 709/203 |
| 5,063,500 A | 11/1991 | Shorter ....................... 709/226 |
| 5,146,593 A | 9/1992 | Brandle et al. ............. 719/328 |
| 5,146,594 A | 9/1992 | Iitsuka ........................ 717/156 |
| 5,175,854 A | 12/1992 | Cheung et al. ............. 718/100 |
| 5,187,787 A | 2/1993 | Skeen et al. ................ 719/314 |
| 5,187,790 A | 2/1993 | East et al. .................. 719/316 |
| 5,247,676 A | 9/1993 | Ozur et al. .................. 719/328 |
| 5,249,293 A | 9/1993 | Schreiber et al. ........... 709/203 |
| 5,257,369 A * | 10/1993 | Skeen et al. ................ 719/312 |
| 5,280,617 A | 1/1994 | Brender et al. ............. 717/159 |
| 5,307,490 A | 4/1994 | Davidson et al. ........... 719/328 |
| 5,381,550 A | 1/1995 | Jourdenais et al. ......... 717/149 |
| 5,430,876 A | 7/1995 | Schreiber et al. ........... 719/328 |
| 5,475,843 A | 12/1995 | Halviatti et al. ............ 717/124 |
| 5,551,040 A | 8/1996 | Blewett ..................... 717/106 |
| 5,864,866 A | 1/1999 | Henckel et al. ............. 707/103 |
| 5,923,879 A | 7/1999 | Sasmazel et al. ........... 717/143 |
| 5,991,823 A * | 11/1999 | Cavanaugh et al. ........ 719/330 |
| 6,026,404 A * | 2/2000 | Adunuthula et al. ......... 707/10 |

(Continued)

OTHER PUBLICATIONS

Wang et al. "The Design and Performance of Meta-Programming Mechanism for Object Broker Middleware" 2001 . pp. 1-17.*

(Continued)

*Primary Examiner*—Van H. Nguyen
(74) *Attorney, Agent, or Firm*—John A. Smart

(57) ABSTRACT

A distributed computing environment is described that provides an improved method for invocation of methods between remote objects. In one embodiment, the improved method comprises steps of: creating a first object having methods that may be invoked by other objects; defining a forward invocation interface for the first object, which allows the methods of the first object to be called in a forward direction; defining a callback method on the first object, for invocation of a method of the first object in a reverse direction; creating a callback handler for handling invocations of the callback method; receiving a callback invocation of the callback method by a callback caller; creating a local reflective target for each received callback; delegating the callback invocation on the callback handler with reference to the local reflective target as an input parameter; and at the first object, making a forward call on the local reflective target.

18 Claims, 8 Drawing Sheets

U.S. PATENT DOCUMENTS

| | | | |
|---|---|---|---|
| 6,282,580 B1 | 8/2001 | Chang | 719/316 |
| 6,351,843 B1 | 2/2002 | Berkley et al. | 717/128 |
| 6,529,932 B1 * | 3/2003 | Dadiomov et al. | 718/101 |
| 6,556,220 B1 | 4/2003 | Hammond | 345/764 |
| 6,560,655 B1 * | 5/2003 | Grambihler et al. | 709/248 |
| 6,609,158 B1 | 8/2003 | Nevarez et al. | 719/316 |
| 6,633,923 B1 * | 10/2003 | Kukura et al. | 719/316 |
| 6,643,650 B1 * | 11/2003 | Slaughter et al. | 707/10 |
| 6,708,223 B1 * | 3/2004 | Wang et al. | 719/315 |
| 6,735,771 B1 | 5/2004 | Houlding | 719/315 |
| 6,748,581 B1 | 6/2004 | Bauer et al. | 717/107 |
| 6,757,899 B2 | 6/2004 | Zhdankin et al. | 719/315 |
| 6,766,519 B1 | 7/2004 | Burriss et al. | 719/321 |
| 6,779,187 B1 | 8/2004 | Hammond | 719/331 |
| 6,792,599 B2 | 9/2004 | Poulsen et al. | 717/136 |
| 6,826,763 B1 * | 11/2004 | Wang et al. | 719/330 |
| 6,970,869 B1 * | 11/2005 | Slaughter et al. | 707/10 |
| 7,010,573 B1 * | 3/2006 | Saulpaugh et al. | 709/206 |
| 7,165,239 B2 * | 1/2007 | Hejlsberg et al. | 717/114 |
| 2002/0165745 A1 * | 11/2002 | Greene et al. | 705/7 |
| 2003/0005181 A1 * | 1/2003 | Bau et al. | 709/330 |
| 2003/0093500 A1 * | 5/2003 | Khodabakchian et al. | 709/219 |
| 2003/0167358 A1 * | 9/2003 | Marvin et al. | 709/328 |
| 2004/0006550 A1 * | 1/2004 | Upton | 707/1 |

OTHER PUBLICATIONS

Sashidhar et al. "Design and Implementation Issues for Supporting Callback Procedures in RPC-Based Distributed Software" 1997 IEEE. p. 460-466.*

Corba, Common Object Request Broker Architecture: Core Specification, Version 3.0.2 Editorial update, Chapter 1, 2, 4, 7, and 13, Dec. 2002.

Corba, Common Object Request Broker Architecture: Core Specification, Version 3.0.2 Editorial update, Chapter 15, 22, Dec. 2002.

* cited by examiner

OBJECT ORIENTED DISTRIBUTED SOFTWARE SYSTEM WITH METHODOLOGY FOR PIGGYBACKED REFLECTIVE CALLBACKS

RELATED APPLICATIONS

The present application is related to and claims the benefit of priority of the following commonly-owned provisional application(s): application Ser. No. 60/420,053, filed Oct. 19, 2002, entitled "Object Oriented Distributed Software System with Methodology for Piggybacked Reflective Callbacks", of which the present application is a non-provisional application thereof. The disclosure of the foregoing application is hereby incorporated by reference in its entirety, including any appendices or attachments thereof, for all purposes.

COMPUTER PROGRAM LISTING APPENDIX

This application includes a transmittal under 37 C.F.R. §1.52(e) of a Computer Program Listing Appendix comprising duplicate compact discs (2), respectively labeled "Copy 1" and "Copy 2". The discs are IBM-PC machine formatted and Microsoft® Windows Operating System compatible, and include identical copies of the following list of files:

| File Name | Created/Last Modified | File Size (KB) |
| --- | --- | --- |
| pull_and_dispatch.C | Dec. 12, 2002 4:43:44 PM | 2597 |
| pull_typed_event.C | Dec. 12, 2002 4:43:44 PM | 3879 |

All of the material disclosed in the Computer Program Listing Appendix is hereby incorporated by reference into the present application.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates generally to the field of distributed computing and, more particularly, to a methodology supporting "piggybacked" reflective callbacks.

2. Description of the Background Art

Distributed computing is a type of computing in which different components and objects comprising an application can be located on different computers connected to a network. With the explosive growth of the Internet, distributed computing has become increasingly popular in order to simplify network programming and to realize component-based software architecture. To support distributed computing, an object framework or model is defined, thereby specifying a set of standards about how objects communicate with one another. Currently, two chief distributed computing standards exist: CORBA and DCOM. Each will be briefly reviewed in turn.

CORBA, short for Common Object Request Broker Architecture, is a distributed object model proposed by the Object Management Group (OMG), an industry consortium. Central to the CORBA architecture is the "Object Request Broker" (ORB) that acts as an "object bus" over which objects transparently interact with other objects located locally or remotely. A CORBA object is represented to the outside world by a defined interface with a set of methods. A particular instance of an object is identified by an object reference. The client of a CORBA object acquires a corresponding object reference for use as a handle to make method calls, as if the object were located in the client's own address space. The ORB is responsible for all the mechanisms required to find the object's implementation, prepare it to receive the request, communicate the request to it, and carry the response or reply (if any) back to the client. The object implementation interacts with the ORB through either an Object Adapter (OA) or through the ORB interface. In this manner, CORBA enables pieces of programs (i.e., components or objects) to communicate with one another regardless of what programming language they were written in or what operating system they are running on.

DCOM, short for Distributed Component Object Model, represents Microsoft's distributed object model. It is implemented as an extension to Microsoft's Component Object Model (COM). DCOM adds an object remote procedure call (ORPC) layer on top of Distributed Computing Environment's remote procedure call mechanism (DCE RPC) to support remote objects. A COM server can create object instances of multiple object classes. A COM object can support multiple interfaces (sets of functionally related methods), each representing a different view or behavior of the object. A COM client interacts with a COM object by acquiring a pointer to one of the object's interfaces and invoking methods through that pointer, as if the object were located in the client's address space. COM specifies that any interface must follow a standard memory layout, which is the same as the C++ virtual function table. Since the specification is at the binary level, it allows integration of binary components possibly written in different programming languages such as C++, Java and Visual Basic. However, unlike CORBA, which runs on many operating systems, DCOM is targeted for use with Microsoft Windows.

Both DCOM and CORBA frameworks provide client-server type of communications. To request a service, a client invokes a method implemented by a remote object, which acts as the server in the client-server model. The service provided by the server is encapsulated as an object and the interface of an object is described in an Interface Definition Language (IDL). The interfaces defined in an IDL file serve as a contract between a server and its clients. Clients interact with a server by invoking methods described in the IDL. The actual object implementation is hidden from the client.

In both DCOM and CORBA, the interactions between a client process and an object server are implemented as object-oriented RPC-style communications. To invoke a remote function, the client makes a call to the client stub. The stub packs the call parameters into a request message, and invokes a wire protocol to ship the message to the server. At the server side, the wire protocol delivers the message to the server stub, which then unpacks the request message and calls the actual function on the object.

Both DCOM and CORBA include a middle layer that functions to provide the client and the server with the illusion that they are in the same address space. The main differences between DCOM and CORBA at this layer include how server objects are registered and when proxy/ stub/skeleton instances are created. To send data across different address spaces requires a process called marshaling and unmarshaling. Marshaling packs a method call's parameters (at a client's space) or return values (at a server's space) into a standard format for transmission. Unmarshaling, the reverse operation, unpacks the standard format to an appropriate data presentation in the address space of a receiving process.

In distributed computing environments, actual method invocation can be performed in a forward or backward manner. Forward-calling technique, which entails simply invoking a function or method on a target, is a rather straightforward approach for developers to use for the purpose of invoking remote functionality. However, the technique has the disadvantage in that it limits the scalability of one's system. Backward calling technique, in contrast, can improve system scalability. However, developers may not be as comfortable with callback technique as they are with forward calling technique. The term "callback" is often used to describe a function or method call made in a backward direction, with the term "call" being used to simply refer to a forward call. The direction is defined quite arbitrary based on application model and therefore meanings of call and callback are purely relative. Also, in object-oriented systems, call (i.e., forward call) and callback are all made on the target or "callee" object's type safe interfaces to generate a semantic result on the callee. When a call is made backward, the semantic result is also intended to be backward.

In many application scenarios, it is necessary to employ a backward invocation to generate a semantic result as if a forward invocation were made. This type of backward invocation is referred to as a "syntax callback" to differentiate it from normal relative callback and to also indicate that, in this backward invocation scenario, the actual intended semantic result is forward.

Syntax callbacks are widely used in distributed software systems, typically to retrieve (i.e., "pull") a request or deliver a reply. For example, in object-oriented event replicating/distributing service, such as OMG CORBA typed event services, strong typed events are defined as operations of an interface. Invoking operations of this interface, by active event suppliers on a remote channel object, will push (typed) events into the channel. This channel also forwards these events by invoking the same operations on remote passive consumer objects. Now, as a widely used reverse event delivery scenario, channel also needs to support a backward pulling model. In the backward pulling model, the channel will callback passive suppliers to pull events out from them as if events are actively pushed into the channel. Active consumers also call back to the channel to pull events back as if they are pushed from channel. As another example, in object-oriented remote asynchronous invocation, such as OMG CORBA Messaging, a request router needs to forward a typed invocation to a specified target object and, then, deliver its reply back to a specified passive reply receiver using a callback.

Presently, there exist two approaches to deal with syntax callback in an object-oriented framework. The first approach is to define a "mangled" interface from the original forward version interface. The mangled interface maps the return value into a first input parameter, maps any exception as a separate signature, and maps the input parameter(s) to output (and vice versa). Then, the active consumers use the mangled interface, the passive supplier, and the asynchronous reply receiver to implement it. This is the approach taken by OMG typed event service and OMG Asynchronous Messaging.

However, the approach is problematic. In most real world applications, mangling an interface immediately defeats the purpose of having an interface. Except for very few trivial cases, mangled interfaces are very difficult to use. Interface definition language (IDL) to programming language mappings need to be extended for each targeted language to support this interface mangling. Language mapping tools (IDL to C++, IDL to Java, etc.) have to be modified to be able to automatically generate the mangled interface. Because the callback uses a mangled interface different from the interface used by forward calling model, the change to the calling model without changing the interface also means massive code changes.

The second approach is to simply abandon the object-oriented interface definition and retreat to a message-oriented paradigm. This is the solution seen in Java Message Service (JMS) and OMG structured notification. The approach is also problematic. A message oriented paradigm usually has a much lower abstraction level than a corresponding object oriented paradigm and, therefore, results in a large semantic gap that has to be filled by application developers. Type safety is also sacrificed. Code is more error prone and less "modular" in organization. Message oriented systems tend to have undesirable strong coupling among software components than object-oriented system. Additional manual code is required to pack/unpack messages. For content rich messages, message sizes are substantially larger than their typed counterparts. For example, for the same ITU-T X.780 CORBA/TMN event, a structured message size is around 300% of its typed counterpart.

Given that, a problem presents itself: how does one support syntax callback by an object-oriented distributed framework (e.g. CORBA, J2EE, etc.)? In other words, how can one employ callback technique for an interface that was originally defined for forward calling technique? With the ever-increasing use of distributed systems, there is much interest in providing a solution to this problem.

GLOSSARY

The following definitions are offered for purposes of illustration, not limitation, in order to assist with understanding the discussion that follows.

Callback: A callback is a method/procedure/function that is registered with a target object, process, service, or the like (e.g., an operating system, another application, a remote object, etc.) to be invoked by the target, usually to handle some event that is initially processed/detected by the target.

Client: A process that invokes a method of an object.

Interface: A named collection of abstract operations (or methods) that represent one functionality.

Object class (or class): A named concrete implementation of one or more interfaces.

Object (or object instance): An instantiation of some object class.

RPC (Remote Procedure Call): A type of protocol that allows a program on one computer to execute a program on a server computer. Using RPC, a system developer need not develop specific procedures for the server. The client program sends a message to the server with appropriate arguments and the server returns a message containing the results of the program executed.

SUMMARY OF THE INVENTION

A distributed computing environment is described that provides an improved method for invocation of methods between remote objects. In one embodiment, the method includes steps of: creating a first object having methods that may be invoked by other objects; defining a forward invocation interface for the first object, which allows the methods of the first object to be called in a forward direction; defining a callback method on the first object, for invocation of a method of the first object in a reverse direction; creating a callback handler for handling invocations of the callback method; creating a second object having a reflective target that supports the forward invocation interface on the first object; receiving an invocation by the second object of the callback handler, the invocation including a reference to the reflective target; and at the first object, downcasting the reflective target so that the invocation by the second object may be processed through the reflective target as if it were a forward invocation.

A distributed computing system with improved invocation of methods between remote objects is described. In one embodiment, the system includes a first object having methods that may be invoked by remote objects; a forward invocation interface for the first object, which allows the methods of the first object to be called in a forward direction; a callback interface for the first object that comprises a single callback, for indicating that another object is calling; a second object invoking the single callback, including passing a reference that includes a signature for the target object; and program logic for creating a local reflective object in response to invocation of the single callback, and for reflecting the callback invocation back into a forward call, by using the local reflective object to invoke the forward invocation interface.

DETAILED DESCRIPTION OF A PREFERRED EMBODIMENT

The following description will focus on the presently-preferred embodiment of the present invention, which is implemented in a distributed computer system operating in an Internet-connected environment running under a conventional operating system, such as the Microsoft® Windows operating system or UNIX operating system. The present invention, however, is not limited to any one particular environment or platform. Instead, those skilled in the art will find that the system and methods of the present invention may be advantageously embodied on a variety of different environments or platforms, including Macintosh, Linux, BeOS, Solaris, FreeBSD, and the like. Therefore, the description of the exemplary embodiments that follows is for purposes of illustration and not limitation.

I. Computer-Based Implementation

A. Basic System Hardware (e.g., for Desktop and Server Computers)

Figure 1:
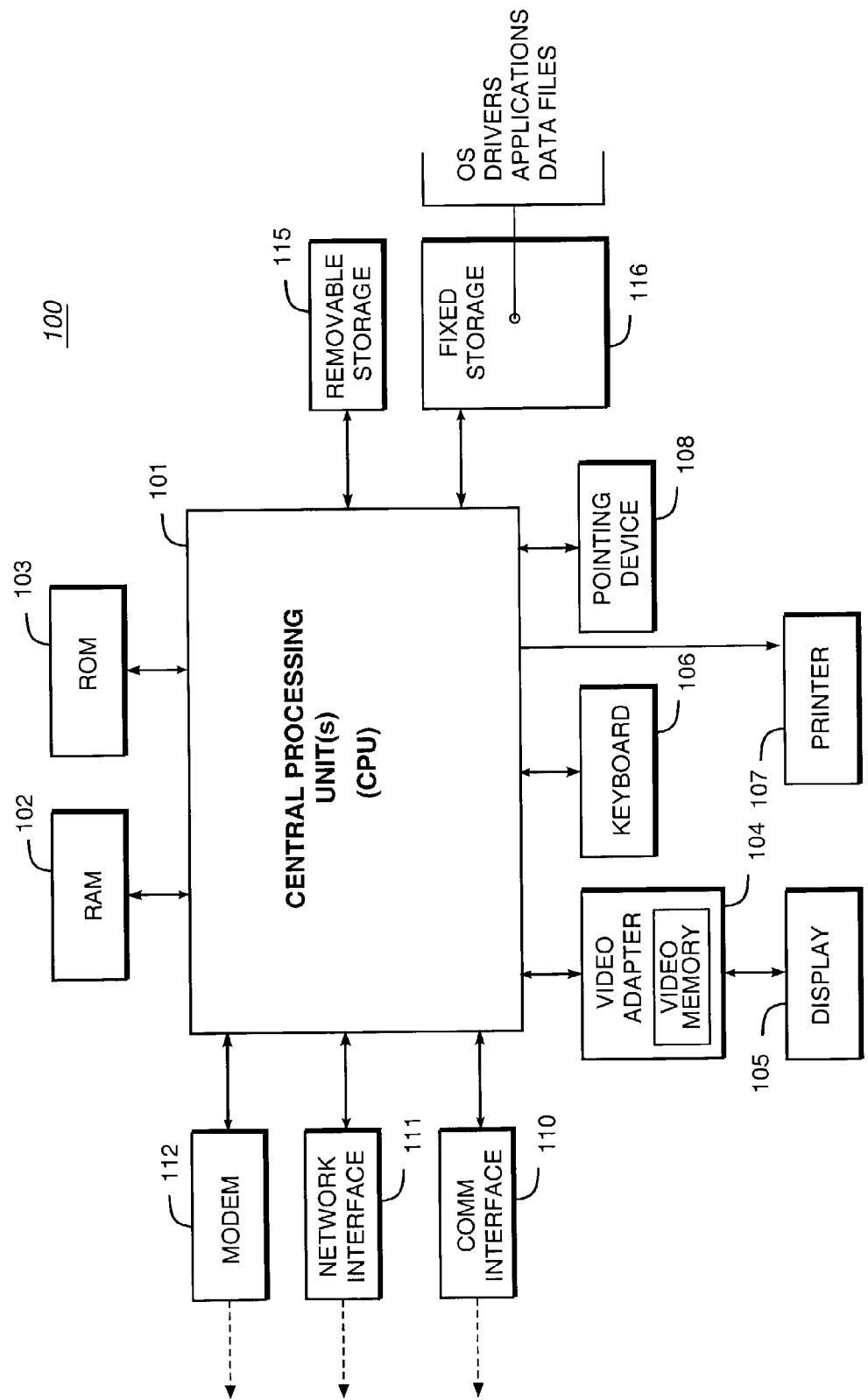
FIG. 1 is a block diagram of a computer system in which software-implemented processes of the present invention may be embodied.

The present invention may be implemented on a conventional or general-purpose computer system, such as an IBM-compatible personal computer (PC) or server computer. FIG. 1 is a very general block diagram of an IBM-compatible system 100. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real-time system clock is included with the system 100, in a conventional manner.

CPU 101 comprises a processor of the Intel Pentium® family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP LaserJet® printer (available from Hewlett-Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Compaq Computers of Houston, Tex., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

B. Basic System Software

Figure 2:
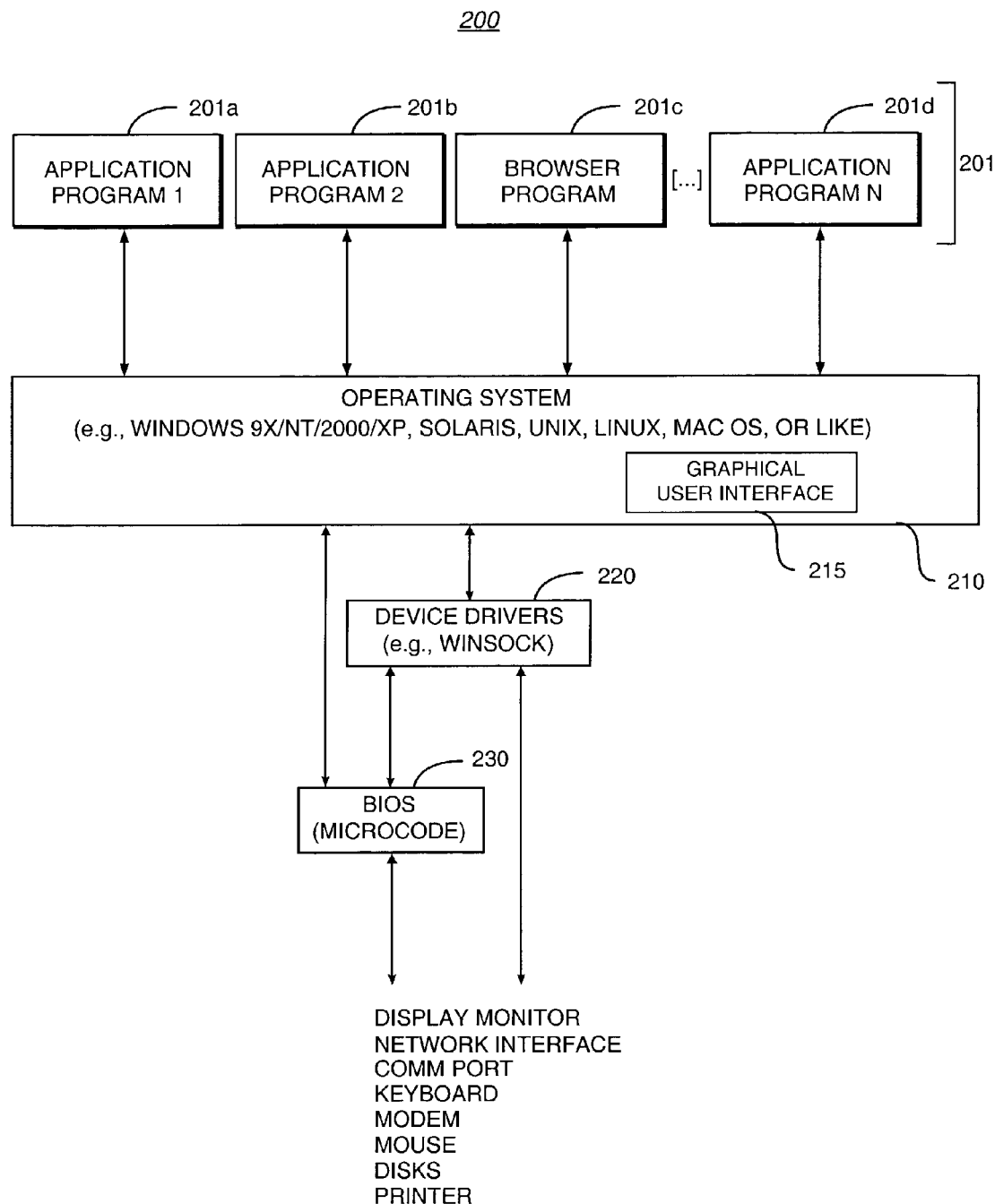
FIG. 2 is a block diagram of a software system for controlling the operation of the computer system.

Illustrated in FIG. 2, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201*a*, 201*b*, 201*c*, 201*d*) may be "loaded" (i.e., transferred from fixed storage 116 into memory 102) for execution by the system 100.

System 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft® Windows 9x, Microsoft® Windows NT, Microsoft® Windows 2000, or Microsoft® Windows XP, all available from Microsoft Corporation of Redmond, Wash. Alternatively, OS 210 can also be an alternative operating system, such as the previously mentioned operating systems.

The above-described computer hardware and software are presented for purposes of illustrating the basic underlying client (e.g., desktop) and server computer components that may be employed for implementing the present invention. For purposes of discussion, the following description will present examples in which it will be assumed that there exists a "server" (e.g., Web server) that communicates with one or more "clients" (e.g., other server computers, or other desktop computers). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

II. Piggybacked Reflective Callbacks

A. Overview of Approaches

1. Reflective Callbacks

Figure 3:
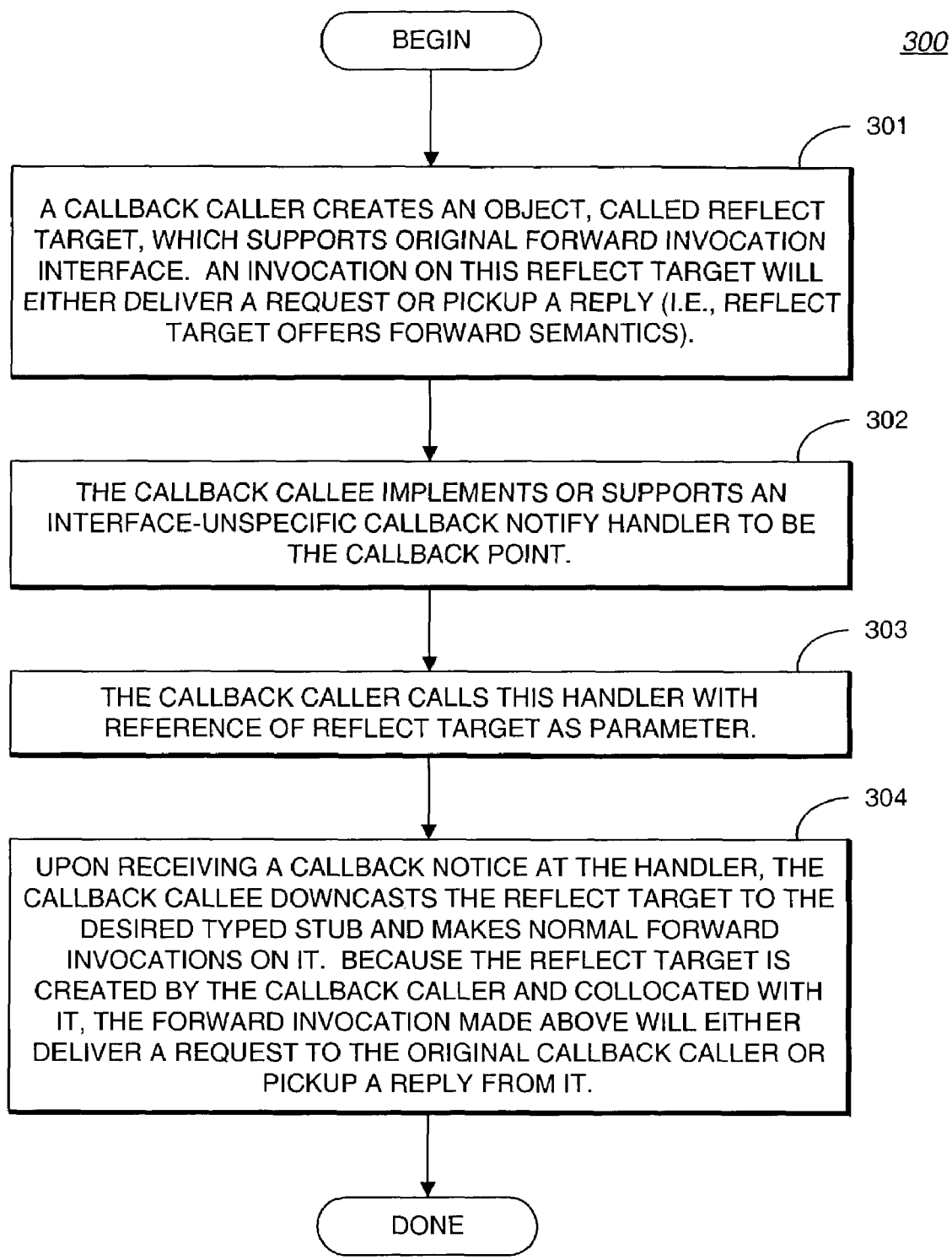
FIG. 3 is a flowchart summarizing a reflective callback methodology of the present invention.

The present invention introduces the notion of reflecting. Reflecting allows a syntax callback to be reverted back into a forward invocation, as seen on the application level. In particular, the middleware environment is modified to provide this transparently. FIG. 3 summarizes the basic approach.

As illustrated by method 300 in FIG. 3, the individual method steps are as follows. As in the case of receiving a normal forward invocation, a callback caller creates an object that serves as a reflective target or "reflect target," which supports the original forward invocation interface, as illustrated at step 301. An invocation on this reflect target will either deliver a request or pickup a reply (i.e., reflect target offers forward semantics). As shown at step 302, the callback callee implements or supports an interface-unspecific callback notify handler to be the callback point. The callback caller call this handler with reference of reflect target as a parameter, as illustrated at step 303. Upon receiving a callback notice at the handler, at step 304, the callback callee downcasts the reflect target to the desired typed stub and makes normal forward invocations on it. Because the reflect target is created by the callback caller and collocated with it, the forward invocation made above will either delivers a request to the original callback caller or pickup a reply from it. This achieves the original purpose of pulling a request back to the callback caller or pushing a reply back to a callback callee. As a variation of the foregoing, instead of creating a reflect target, the callback caller itself is designed (or redesigned) as the reflect target, with its reference being passed for calling by a third party callback worker.

2. "Piggybacked" Reflective Callbacks

Figure 4:
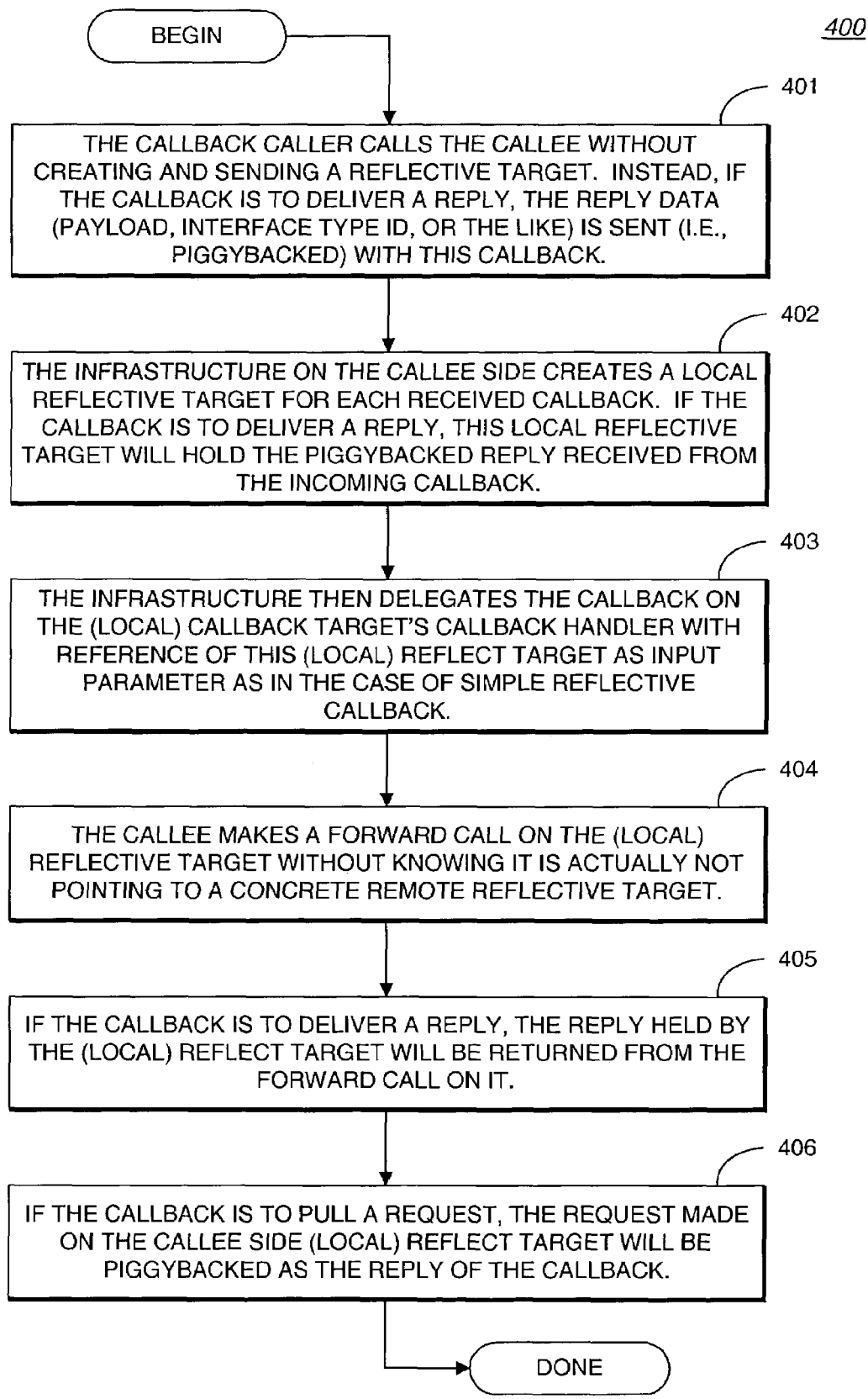
FIG. 4 is a flowchart summarizing a "piggybacked" reflective callback methodology of the present invention.

The present invention also introduces the notion of using a "piggyback," in order to improve network performance. Simple (non-piggybacked) reflective callback described above incurs the cost of two network roundtrips for each callback. With piggyback, only one roundtrip is needed. FIG. 4 summarizes the approach.

As illustrated by method 400 in FIG. 4, the process operates as follows. First, the callback caller calls the callee without creating and sending a reflective target, as illustrated by step 401. Instead, if the callback is to deliver a reply, the reply data (payload, interface type ID, or the like) is sent (i.e., piggybacked) with this callback. The infrastructure on the callee side creates a local reflective target for each received callback, as shown by step 402. If the callback is to deliver a reply, this local reflective target will hold the piggybacked reply received from the incoming callback. The infrastructure then, at step 403, delegates the callback on the (local) callback target's callback handler with reference of this (local) reflect target as input parameter as if the case of simple reflective callback. As illustrated by step 404, the callee makes a forward call on the (local) reflective target without knowing it is actually not pointing to a concrete remote reflective target. If the callback is to deliver a reply, the reply held by the (local) reflect target will be returned from the forward call on it, as shown by step 405. If the callback is to pull a request, the request made on the callee-side (local) reflect target will be piggybacked as a reply of the callback, as illustrated by step 406.

3. Advantages

The piggybacked reflective callback technique allows the distributed computing development system of the present invention to support event system and messaging system in a true object oriented style. The resulting system is much easy for developers to use and understand, and therefore provides a more attractive solution for developing distributed computing applications. In contrast to the traditional direct invocation model employed by prior art systems (e.g., JMS and MDB in J2EE), the approach provide scalability to the enterprise environment and also provides the fault tolerant semantics required by enterprise applications.

B. Exemplary Call Scenarios

Figure 5A:
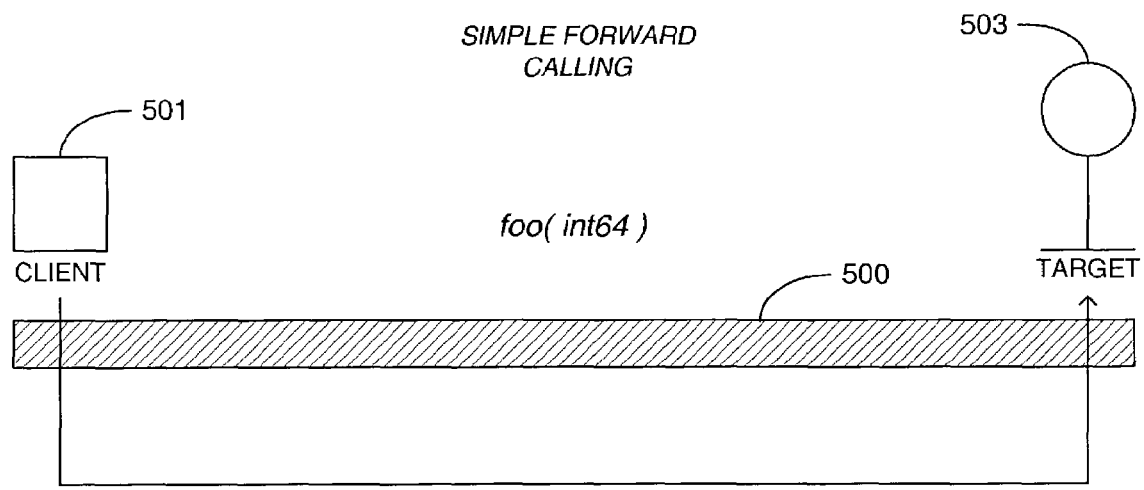
FIG. 5A is a block diagram illustrating a simple forward-calling scenario in a distributed environment.

FIG. 5A illustrates a simple forward-calling scenario in a distributed environment. As shown, infrastructure 500 provides an object code platform that allows client 501 to invoke remote target 503. The infrastructure 500 hides lower-level details from executing applications. In use, an application announces the existence of target 503, including defining an interface to the target, including for example of defining methods (including their input parameters and return values) that may be invoked on the target. Now, the client 501 may make an invocation on the target 503. Here, the client 501 actively sends a message to the target 503 (via Interface 500), for invoking the target. From the perspective of the client 501, the defined interface appears locally (i.e., as a local interface). During invocation, the infrastructure 500 provides the necessary low-level mechanism for allowing the client 501 to invoke the remote target 503. In this simple forward-calling scenario, the invoked function is defined at the time of interface definition.

Figure 5B:
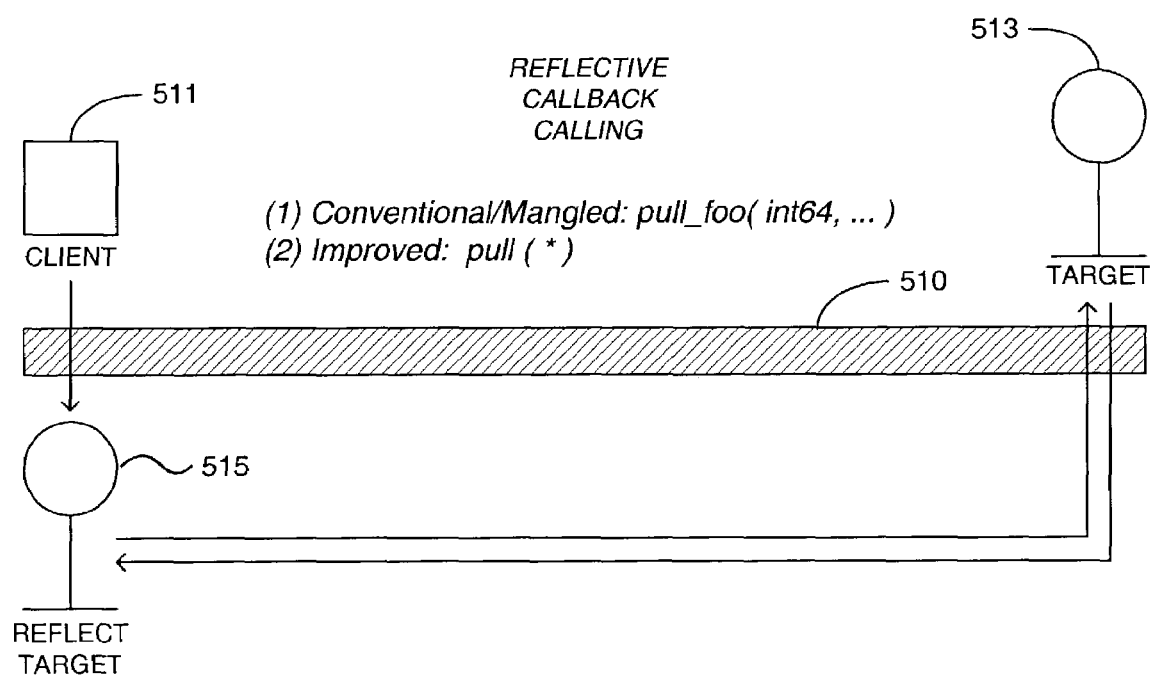
FIG. 5B is a block diagram illustrating a reflective callback scenario in a distributed environment.

FIG. 5B illustrates a reflective callback scenario. As shown, a client 511, a target 513, and an interface 510 still exist. However, instead of the client 511 actively sending a message to the target 513, the client 511 wants to passively wait for the target 513 to, in effect, come to the client 511 to demand a message. The approach of prior art systems is rather naive: simply define a callback. Given a previously defined forward interface (e.g., with input parameter information), one is required to map each operation into a callback interface. For example, the method or operation foo (int64) is mapped into pull_foo(int64), and so forth and so on for all of the methods of the interface. This approach, which is referred to as "mangling," requires each operation to be renamed and requires each input parameter to be mapped into an output parameter. Since interfaces typically include a multitude of methods or operations, the mangling approach is very tedious to use.

The present invention improves performance by adopting a reverse approach. Instead of instead of adopting the above mangling approach, the approach of the present invention is to predefine a callback interface with only a single callback operation, for example pull(*), which indicates that the target is calling. A single callback operation takes as an input parameter a void pointer, which will be used to reference a passed-in object. The operation is defined with only a single import parameter, a callback-reflective callback reference. If the client 511 has any information to send, it sends that information via the single callback. The single callback, in turn, passes the information to the target 513, as if using simple forward calling invocation. Here, the infrastructure 510 catches the call, creates a reflective object locally (reflect target 515), and then makes a forward call to the target 513. Thus, the callback object need only implement a single operation. Further, the single operation is independent of any user-defined interface. The reflect target 515 includes the entire interface of target 513.

The single callback operation, pull(*), is invoked with an object pointer to a passed-in object (with appropriate down casting for type compatibility between the void pointer parameter and the object pointer). The passed-in object includes the entire signature as the target object. In this manner, the application need only implement pull(*). For example, if the pull(*) operation is invoked with a pointer to object A, then subsequently the client may forward invoke foo(int64) simply by invoking A→foo(int64). Here, the backward call (callback) is "reflected" back into a forward call.

C. Preferred Implementation

1. Architecture

Figure 6:
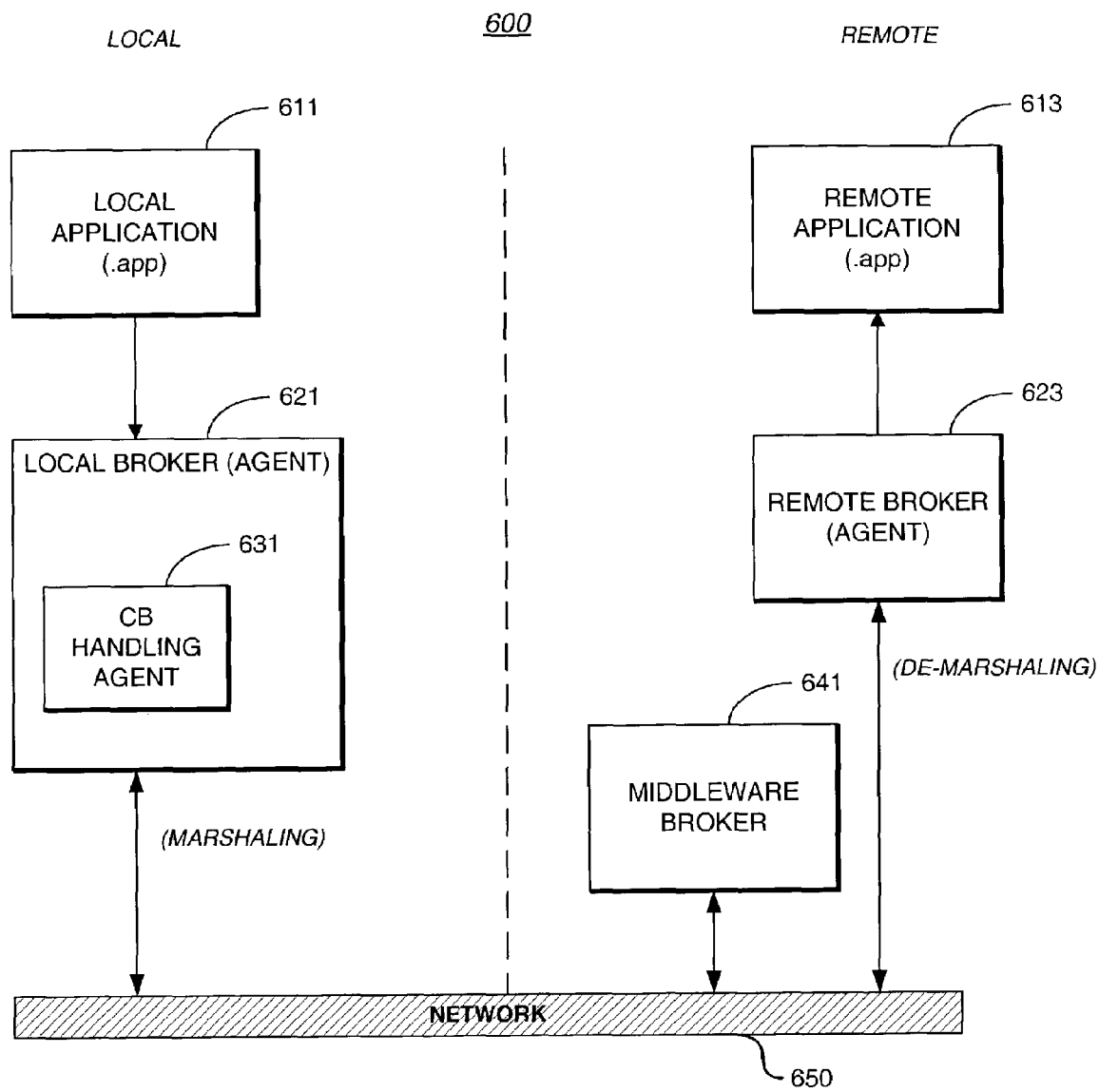
FIG. 6 is a high-level block diagram illustrating a distributed computing environment constructed in accordance with the present invention.

FIG. 6 is a high-level block diagram illustrating a distributed computing environment 600 constructed in accordance with the present invention. From the perspective of a given client (e.g., process A), the environment may be thought of as having local and remote components. Local components include local application 611 and local broker (agent) 621. The local broker 621 includes a callback handling agent 631 (described below). These components communicate via network 650 with remote components. The remote components include remote application 613, local broker (agent) 623, and middleware broker 641. In basic (forward calling) operation, the local application 611 invokes remote functionality as follows. At the outset, the local application 611 calls into the local broker 621. The local broker's job is to package or "marshal" the operation (method) name and a corresponding input parameters into a message (which is used at the target for the remote invocation). With the help of the middleware broker 641, the message is transferred to a corresponding "de-marshaling" broker at the correct target. This "de-marshaling" broker is the remote system's local broker 623 (which also serves as the local broker for the remote application 613). The "de-marshaling" broker (623) decodes the message, to retrieve the operation name and input parameters. With this information, the target operation or method may be invoked (for a forward calling scenario). Implementation of the broker 621 is modified to include callback handling agent 631, which supports the new methodology. Additionally, the middleware broker 461 is slightly modified so that its communication protocol now allows it to communicate with the callback handling agent 631. Operation of these modified components will next be described.

2. Operation a) Scenario #1: Information Provider

Figure 7A:
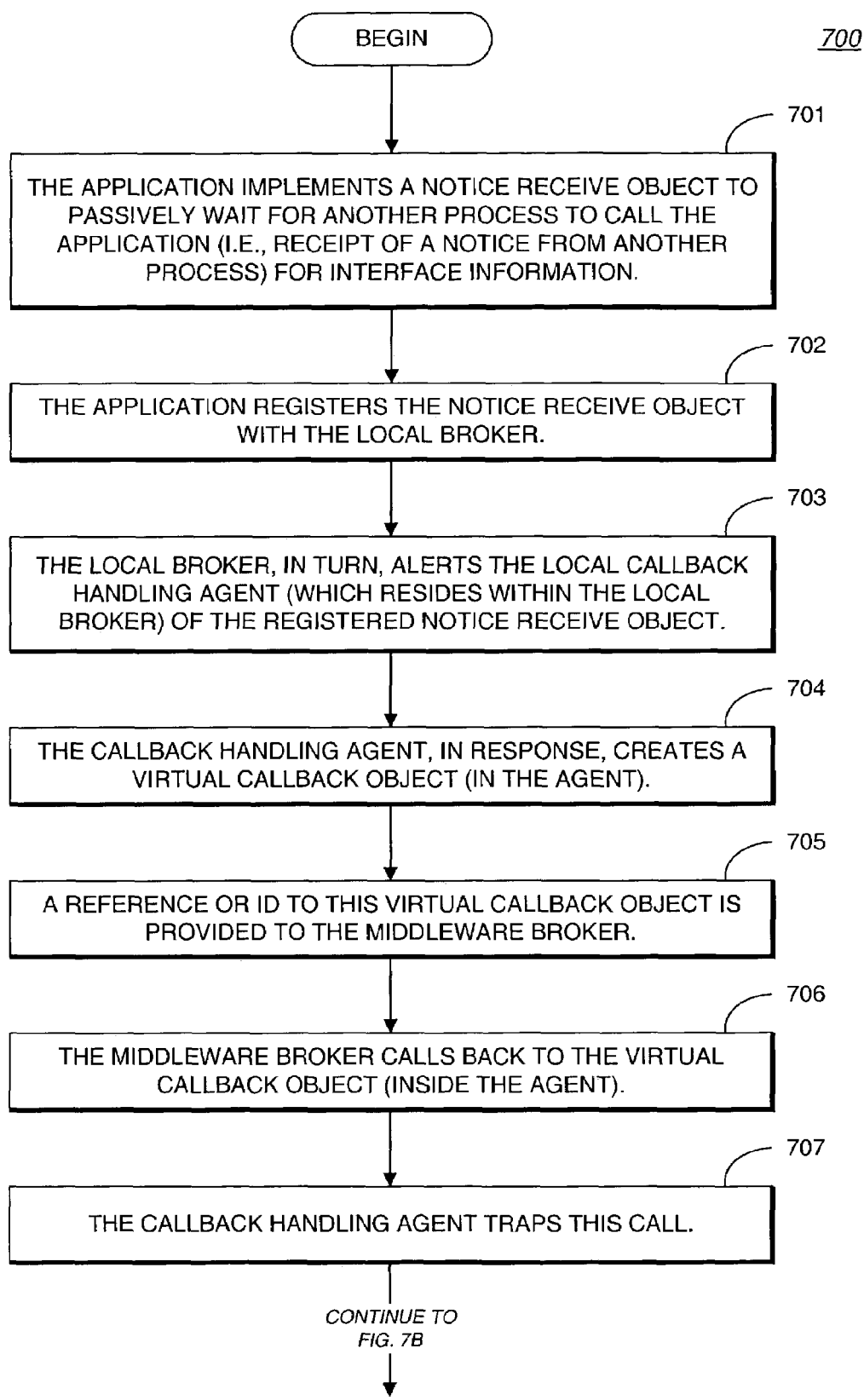
FIGS. 7A-B comprise a single flowchart illustrating a methodology of the present invention that allows middleware to "pull" interface information.
Figure 7B:
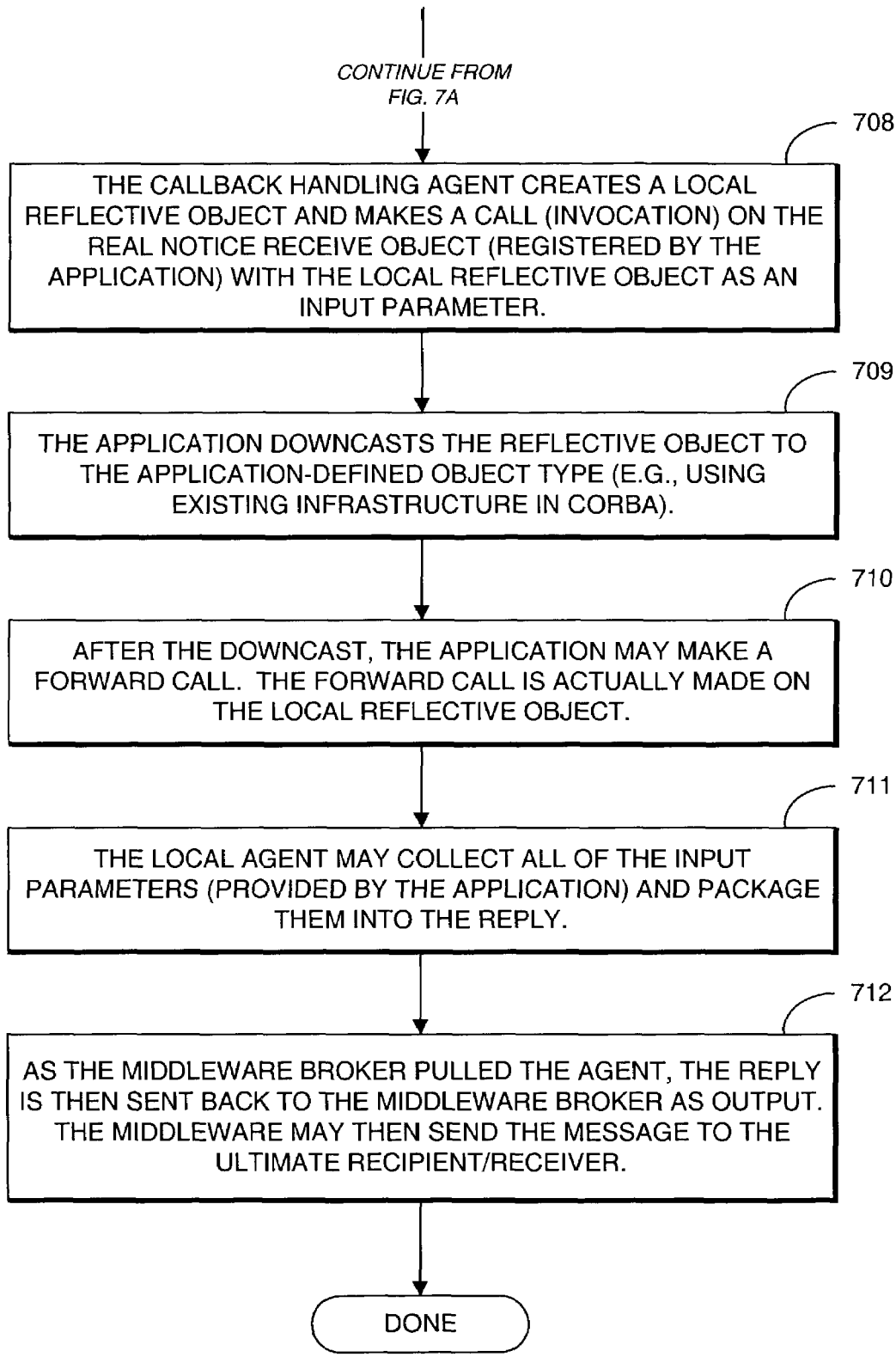

The first scenario involves providing an application's interface information through the middleware broker (i.e., not provided directly to an individual receiver). Usually, one would make a forward call (i.e., "push") from the application to the middleware broker to post that information for distribution by the middleware to receivers. In accordance with the present invention, this scenario is changed. Instead of the foregoing "push" approach, the present invention employs a "pull" approach so that individual receivers pull the information (e.g., based on criteria that a given receiver decides). A local handler is installed that has only one object named "pull." A given receiver can call back the handler for receiving interface information. FIGS. 7A-B summarizes an exemplary method 700 of the present invention that allows the middleware to perform a "pulling" (operation) for interface information. Here, it is desirable for the application to get a notice, instead of a mangled callback. The notice itself has a passed-in reference (reflective object reference) so that the application may make a forward call on the reflective object. The interface information in turn is carried back via the handler.

The individual steps are as follows. At the outset, the application implements a "notice receive" object whose purpose is to wait for a request to "pull" the (interface information) message. Thus, as indicated at step 701, the application implements a "notice receive" object to passively wait for another process to call the application (i.e., receipt of a "notice" from another process) for interface information; in response to receipt of this notice, the "notice receive" object may reply. The "notice receive" object is a callback object. However, unlike the mangled callback approach, the "notice receive" object is predefined with only a single operation (e.g., "pull") or small set of operations. The "notice receive" object is independent of what the application provides as the interface information. As indicated at step 702, the application registers the "notice receive" object with the local broker. In CORBA, for example, the object may be registered using the CORBA "adapter." The local broker, in turn, alerts the local callback handling agent (which resides within the local broker) of the registered "notice receive" object, as indicated by step 703. As shown by step 704, the callback handling agent, in response, creates a virtual callback object (in the agent). Then, at step 705, a reference or ID to this virtual callback object is provided to the middleware broker. The middleware broker only knows about the virtual callback object; it does not know anything about the "notice receive" object.

Now, at step 706, the middleware broker calls back to the virtual callback object (inside the agent). The callback handling agent traps this call, as indicated at step 707. Then, at step 708, the callback handling agent creates a local reflective object and makes a call (invocation) on the real "notice receive" object (registered by the application) with the local reflective object as an input parameter. The application may now downcast the reflective object to the application-defined object type (e.g., using existing infrastructure in CORBA), as shown at step 709. After the downcast, the application may make a forward call, as indicated by step 710. The forward call is actually made on the local reflective object. As indicated at step 711, the local agent may collect all of the input parameters (provided by the application) and package them into the reply. As the middleware broker "pulled" the agent, the reply is then sent back to the middleware broker as output, as indicated by step 712. The middleware may then send the message to the ultimate recipient/receiver.

b) Scenario #2: Callback Object is Reflective

The second scenario is a slight variation of the first scenario. Instead of creating a reflective object, the callback call itself is already structured as a reflective object. Instead of the middleware "pulling" information from the application, the application "pulls" information from the middleware. However, instead of pulling directly from the middleware, the application pulls from the local broker. The local broker will pull the event and determine who the event is responding to.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. In a distributed computing environment, an improved method for invocation of methods between remote objects, the method comprising:

creating a first object having methods invoked by other objects, in a manner that appears as if the first object is being invoked in the other objects' address space;

defining a forward invocation interface for the first object, which allows the methods of the first object to be called in a forward direction;

defining a callback method on the first object, for invocation of a method of the first object in a reverse direction;

creating a callback handler for handling invocations of the callback method;

creating a second object having a reflective target that supports said forward invocation interface on the first object;

receiving an invocation by the second object of the callback handler, said invocation including a reference to the reflective target; and at the first object, downcasting the reflective target so that said invocation by the second object processed through the reflective target as if it were a forward invocation.

2. The method of claim 1, wherein said reflective target supports said forward invocation interface.

3. The method of claim 1, wherein invocation of the reflective target delivers a selected one of a request or a pickup of a reply.

4. The method of claim 1, wherein said first object implements the callback handler.

5. The method of claim 1, wherein the first object downcasts the reflective target to a desired typed stub and then makes a normal forward invocation on it.

6. The method of claim 5, wherein said forward invocation made through the reflective target returns a selected one of a request to the second object or a reply from the second object.

7. The method of claim 1, wherein said first object functions as the reflective target, with its own reference being passed as a reflective target reference for invocation by a callback caller.

8. The method of claim 1, wherein the reflective target is collocated with the first object.

9. A computer-readable medium having processor-executable instructions for performing the method of claim 1.

10. A downloadable set of processor-executable instructions for performing the method of claim 1.

11. A distributed computing system with improved invocation of methods between remote objects, the system comprising:
- at least one processor;
- a memory coupled to the at least one processor;
- a first object having methods invoked by remote objects, in a manner that appears as if the first object is being invoked in the remote objects' address space;
- a forward invocation interface for the first object, which allows the methods of the first object to be called in a forward direction;
- a callback interface for the first object that comprises a single callback, for handling another object's call to invoke a method of the first object in a reverse direction;
- a second object having a reflective target that supports said forward invocation interface on the first object and for invoking the single callback, including passing a reference that includes a signature for the reflective target; and
- program logic for downcasting the reflective target so that said invocation by the second object processed through the reflective target as if it were a forward invocation.

12. The system of claim 11, wherein said reflective target supports said forward invocation interface.

13. The system of claim 11, wherein invocation of the reflective target delivers a selected one of a request or a pickup of a reply.

14. The system of claim 11, wherein said first object implements the callback interface.

15. The system of claim 11, wherein the first object downcasts the reflective target to a desired typed stub and then makes a normal forward invocation on it.

16. The system of claim 15, wherein said forward invocation made through the reflective target returns a selected one of a request to the second object or a reply from the second object.

17. The system of claim 11, wherein said first object functions as the reflective target, with its own reference being passed as a reflective target reference for invocation by a callback caller.

18. The system of claim 11, wherein the reflective target is collocated with the first object.

* * * * *